United States Patent Office 3,582,265
Patented June 1, 1971

3,582,265
DIBASIC MAGNESIUM HYPOCHLORITE
John J. Bishop, Enon, Ohio, and Samuel I. Trotz, Orange, Conn., assignors to Olin Corporation
No Drawing. Filed June 2, 1969, Ser. No. 829,795
Int. Cl. C01d; C01f; C01g
U.S. Cl. 23—50                    4 Claims

ABSTRACT OF THE DISCLOSURE

Dibasic magnesium hypochlorite compositions containing 90% or more of $Mg(OCl)_2 \cdot 2Mg(OH)_2$ and from 52 to 60% available chlorine are prepared by adding concentrated alkaline solutions of a water-soluble hypochlorite slowly to concentrated acid solutions of magnesium salts and separating the precipitated dibasic magnesium hypochlorite.

---

This invention relates to novel magnesium hypochlorite compositions and to an improved method for preparing them. More particularly it relates to solid compositions of dibasic magnesium hypochlorite and the method of preparing them.

Many attempts have been made in the prior art to prepare magnesium hypochlorite compositions. Aqueous solutions containing magnesium ions and hypochlorite ions are readily prepared but solid compositions even approximating the formula $Mg(OCl)_2$ have never been reported. A basic magnesium hypochlorite was reported by Nozaki et al. in a Japanese publication abstracted in Chemical Abstracts, 48, 14134f (1954). This "magnesium bleaching powder" was attributed to the formula

$$Mg(OH)(OCl \cdot Mg(OH)_2 \cdot 2H_2O$$

having a molar ratio of OH ion to OCl ion of 3:1. This tribasic magnesium hypochlorite contained a maximum of 40% available chlorine. Fukasawa, in a publication abstracted in Chemical Abstracts 62, 3665 (1965), reported the preparation of "magnesium bleaching powder" having a maximum available chlorine of 44%.

In contrast to this art, the novel compositions of this invention are essentially dibasic magnesium hypochlorite corresponding substantially to the formula

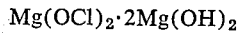
$$Mg(OCl)_2 \cdot 2Mg(OH)_2$$

having a theoretical available chlorine of 58.16% and actually containing from 52 to 60% available chlorine. The novel dibasic magnesium hypochlorite of this invention is prepared by:

(1) Addition of alkaline aqueous solution of a hypochlorite to an acidic aqueous solution of magnesium salt;

(2) Said magnesium salt selected from the group consisting of magnesium chloride and magnesium nitrate and said solution of magnesium salt containing at least about 15 percent by weight of said magnesium salt, calculated as the anhydrous salt;

(3) Said hypochlorite selected from the group consisting of sodium hypochlorite, potassium hypochlorite and calcium hypochlorite and said solution of hypochlorite containing from 2 to 10 gram moles per liter of hypochlorite ion;

(4) Maintaining the pH of the reaction mixture between 3 and 7 during said addition;

(5) Maintaining the rate of said addition between about 0.1 and 1.0 gram mole of hypochlorite ion per kilogram of magnesium salt solution per hour;

(6) Discontinuing said addition when the molar ratio of magnesium salt to added hypochlorite ion is between 1:1 and 10:1; and (7) Separating the dibasic magnesium hypochlorite precipitated in the reaction mixture from the remaining aqueous solution.

Magnesium salt solutions suitable for use according to the present invention contain at least about 15 percent by weight of magnesium salt, calculated as the anhydrous salt and preferably contain from 35 to 45 percent of salt (anhydrous). The more concentrated solutions produce better quality dibasic magnesium hypochlorite compositions. The solutions are suitably saturated soltuions at temperatures of 15 to 50° C. It is also suitable to use initially a mixture of saturated solution and additional undissolved solute. The undissolved solute dissolves without difficulty as the reaction proceeds. The solutions are conveniently prepared by dissolving the commercially available salts in water. Suitable magnesium salts according to the present invention are magnesium chloride and magnesium nitrate.

Concentrated solutions of water-soluble hypochlorites suitable for use in the process of this invention are conveniently prepared by dissolving commercially available solid hypochlorites, particularly calcium hypochlorite, in water or by chlorinating aqueous alkalies, for example, aqueous solutions of caustic soda, aqueous lime slurries or mixed alkalies, particularly a slurry of lime in aqueous caustic soda solutions. These chlorinations are carried out in known manner maintaining residual alkalinity and preferably temperatures below room temperature to avoid decomposition. Sodium chloride, when present in sufficient amounts, is precipitated and is advantageously separated from the hypochlorite solution in any convenient manner, for example, by filtering or centrifuging. Using concentrated caustic soda solutions or thick slurries of lime, alkaline hypochlorite solutions are suitably prepared containing from 2 to 10 gram moles per liter of hypochlorite ion.

It is an important feature of this invention that alkaline hypochlorite solution is added to acidic magnesium salt solution maintaining the pH of the reaction mixture below 7. Initially, aqueous magnesium chloride solutions have a pH of about 3 to 3.5 and such acidity causes considerable decomposition of hypochlorite. However, any loss of available chlorine is minor since the pH of the reaction mixture rapidly rises to about 5 as addition of alkaline hypochlorite begins and, within the limits of proportions of reactants herein defined, remains between about 5 and 7 until the addition of the hypochlorite is complete. Magnesium hydroxide may be precipitated at a pH above 7 and it is a contaminant to be avoided in the preparation of compositions having available chlorine content above 52%. For these reasons, it is important to add the alkaline hypochlorite solution to the acidic magnesium salt solution maintaining the pH range between about 5 and below 7 during the addition.

It is a further important feature of this invention that the hypochlorite solution be added slowly to the magnesium salt solution. For reasons that are unclear, yields are materially less when the addition is rapid. Using hypochlorite and magnesium salt solutions of the concentrations defined herein, the rate of addition of the hypochlorite solution should not exceed about 1 gram mole of hypochlorite ion per kilogram of magnesium salt solution per hour and is appropriately in the range of about 0.1 to 1 gram mole per kilo per hour. Preferably the rate is in the range of 0.2 to 0.7 gram mole per kilo per hour.

In general, temperature effects are minor in the process of this invention and are not critical but should be maintained above temperature at which excessive crystallization of the magnesium salt prevents adequate mixing and below temperatures at which significant decomposition of the hypochlorite occurs. Temperatures of about 15° to 50° C. are generally suitable.

Under the conditions defined herein, the dibasic magnesium hypochlorite product precipitates and is separated from the remaining aqueous solution by any suitable means, for example, filtration or centrifugation. It is dried at temperatures conventionally used for hypochlorite products, suitably below about 55° C. and preferably in vacuum.

In the following examples, all the percentages are percents by weight and the moles are gram moles except as noted.

EXAMPLE I

A solution of 50 g. of NaOH in 50 ml. of water was chlorinated to pH 13.6 at 10° to 15° C. The NaCl formed was removed by filtration. The filtrate, amounting to 67 ml. containing 0.44 mole of sodium hypochlorite was added slowly with stirring during four hours to a solution of 280 g. of $MgCl_2 \cdot 6H_2O$ (1.38 moles) in 70 ml. of water. This solution contained 36.8% magnesium chloride (anhydrous). The rate of addition was 0.314 gram mole of hypochlorite per kilogram of magnesium chloride solution per hour. The temperature during addition was maintained between 28° to 32° C. The pH of the magnesium chloride solution was initially about 3.5 but after addition of hypochlorite started was in the range of 5.4 to 6.0. The mixture was stirred overnight (16 hours) at about 31° C. and the solid was then filtered and washed three times with 100-ml. portions of water. The solid product was dried under vacuum at room temperature to produce 19 g. (0.75 mole) of solid dibasic magnesium hypochlorite. The product had the following analysis:

|  | Theory | Found |
| --- | --- | --- |
| Magnesium | 29.90 | 29.33; 29.07 |
| Chlorine, available | 58.16 | 58.7; 59.0 |
| Sodium | 0 | 0.01; 0.012 |
| Hydrogen | 1.64 | 1.70; 1.70 |

EXAMPLE II

A solution of $Ca(OCl)_2$ containing approximately 0.64 mole $Ca(OCl)_2$ in 425 ml. of $H_2O$, was added slowly with stirring during a period of 5.5 hours to a solution of 900 g. of $MgCl_2 \cdot 6H_2O$ (4.43 moles) dissolved in 250 ml. of water. This solution contained 36.0% magnesium chloride (anhydrous). The rate of addition was 0.203 gram mole of hypochlorite ion per kilogram of magnesium chloride solution per hour. The temperature during the addition was from 28° to 37° C. The mixture was stirred for 16 hours and filtered. The solid was washed with two 100-ml. portions of $H_2O$ and one 50-ml. portion of $H_2O$ by slurrying the solid with the liquid and filtering each time. The solid was dried on the filter and then under vacuum at room temperature for 24 hours. The resulting 40.4 g. of dibasic magnesium hypochlorite contained 56.8% available chlorine indicating a purity of 97.6%.

EXAMPLE III

A sodium hypochlorite solution was prepared as described in Example I. It contained 0.41 mole of hypochlorite and was added over a period of 6 hours to a stirred solution of 258 g. (1.27 moles) of $MgCl_2 \cdot 6H_2O$ and 70 g. of water. This solution contained 36.7% magnesium chloride (anhydrous). The rate of addition was 0.211 gram mole of hypochlorite ion per kilogram of magnesium chloride solution per hour and the final molar ratio of magnesium chloride to hypochlorite was 3.1:1. The pH during the addition was 5.3 to 5.8. The precipitated dibasic magnesium hypochlorite was filtered, washed and dried in vacuum to yield a product containing 56.55% available chlorine indicating a purity of 97.4%.

EXAMPLE IV

A solution containing 0.310 mole OCl was prepared by dissolving 37 g. of commercial calcium hypochlorite in 100 ml. of $H_2O$ and filtering. The filtrate was then added to a solution containing 230 g. of $Mg(NO_3)_2 \cdot 6H_2O$ (0.895 mole) in 90 ml. of $H_2O$. This solution contained 41.6% of $Mg(NO_3)$ anhydrous. The addition took 3 hours. The rate of addition was 0.645 gram moles of hypochlorite ion per kilogram of magnesium nitrate solution per hour. After stirring for 20 additional minutes, the mixture was filtered and the solid was washed by slurrying it three times with 20-ml. portions of $H_2O$, filtering after each wash. The solid dibasic magnesium hypochlorite was dried under vacuum and assayed 55.35% available chlorine indicating a purity of 95.1%.

EXAMPLE V

A solution containing 2.72 moles of $Ca(OCl)_2$ was prepared by dissolving 660 g. of commercial calcium hypochlorite in 1700 ml. of water and filtering. The filtrate was added to a solution of 3600 g. (17.7 moles) of $MgCl_2 \cdot 6H_2O$ in one liter of water during a period of 3.25 hours at a temperature of 31° to 36° C. The magnesium chloride solution contained 36.1% $MgCl_2$ (anhydrous). The rate of addition was 0.363 gram moles of hypochlorite ion per kilogram of magnesium chloride solution per hour. The pH during the addition was 6.0 to 6.6. The mixture was stirred overnight (about 17 hours) and then filtered. The solid was washed by slurrying it four times with 200-ml. portions of water and filtering each time. The solid was dried under vacuum at room temperature to yield 145 g. of solid dibasic magnesium hypochlorite containing 56.8% of available chlorine. The purity was 97.6%.

EXAMPLE VI

A solution of calcium hypochlorite was made by adding dry commercial calcium hypochlorite to water with stirring and then filtering. The resulting filtrate amounted to 551.5 pounds containing 70.9 pounds of hypochlorite ion.

A magnesium chloride solution was prepared by dissolving 729 pounds of $MgCl_2 \cdot 6H_2O$ in 22 gallons of water. This solution contained 36.8% of $MgCl_2$ (anhydrous). The calcium hypochlorite solution was added to the magnesium chloride solution slowly with stirring under nitrogen, maintaining the temperature at 30° to 40° C. The time of addition was 4.64 hours. The rate of addition corresponds to 0.328 gram moles of hypochlorite ion per kilogram of magnesium chloride solution per hour. Stirring was continued overnight and the slurry was filtered. The cake was reslurried with water and filtered. The cake was washed 4 times in this way and was dried in a vacuum oven below 55° C. to produce dibasic magnesium hypochlorite containing 2.6% water and 53.6% available chlorine. The purity was 92.3%.

EXAMPLE VII

A solution containing 0.259 mole of $Ca(OCl)_2$ and having a concentration of 3.24 moles of hypochlorite ion per liter was added during a period of 4.75 hours to a solution of 314 g. (1.55 moles) of $MgCl_2 \cdot 6H_2O$ dissolved in 39.3 ml. of water. The magnesium chloride solution contained 41.0% of $MgCl_2$ (anhydrous). The rate of addition was 0.308 gram moles of hypochlorite ion per kilogram of magnesium chloride solution per hour. The pH during the addition was 5.9 to 6.3. The precipitated dibasic magnesium hypochlorite was filtered, washed and dried in vacuum. The resulting solid dibasic magnesium hypochlorite contained 54.5% available chlorine indicating a purity of 94%.

EXAMPLE VIII

Repetition of the procedure of Example III substituting potassium hypochlorite solution of the same concentration for sodium hypochlorite yields dibasic magnesium hypochlorite of a purity above 90%.

Utility for dibasic magnesium hypochlorite is advantageously based on the remarkable stability of this available chlorine compared with other inorganic compounds containing more than 50% available chlorine. The following data compare the loss of available chlorine in an accelerated stability test of dibasic magnesium hypochlorite and dibasic calcium hypochlorite alone and admixed with various detergent builders.

| Dibasic hypochlorite | Builder | Temp., °F. | Relative humidity | Loss of available chlorine, percent |
|---|---|---|---|---|
| Magnesium | | 73 | 50 | 12.0 |
| Calcium | | 73 | 50 | 14.16 |
| Magnesium | | 75 | 80 | 15.0 |
| Calcium | | 75 | 80 | 56.18 |
| Magnesium | "Tide" | 73 | 50 | 28.25 |
| Calcium | do | 73 | 50 | 32.09 |
| Magnesium | TSP [a] | 73 | 50 | 10.03 |
| Calcium | TSP [a] | 73 | 50 | 19.13 |
| Magnesium | STPP [b] | 73 | 50 | 7.80 |
| Calcium | STPP [b] | 73 | 50 | 95.67 |

[a] Trisodium phosphate.
[b] Sodium tripolyphosphate pentahydrate.

Dibasic magnesium hypochlorite is especially advantageous as an available chlorine source in scouring powders where it provides outstanding shelf life and controlled release at a slow rate for maximum sanitizing effect. The same properties make it advantageous as a textile bleaching agent which does not produce pinholes in fabrics. On heating dibasic magnesium hypochlorite, e.g., to about 325° C., chlorinous gases are generated endothermically in contrast to dibasic calcium hypochlorite and high test calcium hypochlorite (70% available chlorine) which decompose exothermically, yielding primarily oxygen. On removing the source of heat, decomposition of dibasic magnesium hypochlorite ceases and gas generation stops so that the reaction is conveniently controllable. For these reasons, dibasic magnesium hypochlorite is advantageously useful for space disinfection and sterilization where high test calcium hypochlorite is not.

What is claimed is:
1. Solid dibasic magnesium hypochlorite having the formula $Mg(OCl)_2 \cdot 2Mg(OH)_2$.

2. Method for preparing dibasic magnesium hypochlorite as claimed in claim 1 by:
   (1) Addition of alkaline aqueous solution of a hypochlorite to an acidic aqueous solution of magnesium salt;
   (2) Said magnesium salt selected from the group consisting of magnesium chloride and magnesium nitrate and said solution of magnesium salt containing at least about 15 percent by weight of said magnesium salt, calculated as the anhydrous salt;
   (3) Said hypochlorite selected from the group consisting of sodium hypochlorite, potassium hypochlorite and calcium hypochlorite and said solution of hypochlorite containing from 2 to 10 gram moles per liter of hypochlorite ion;
   (4) Maintaining the pH of the reaction mixture between 3 and 7 during said addition;
   (5) Maintaining the rate of said addition between about 0.1 and 1.0 gram mole of hypochlorite ion per kilogram of magnesium salt solution per hour;
   (6) Discontinuing said addition when the molar ratio of magnesium salt to added hypochlorite ion is between 1:1 and 10:1; and
   (7) Separating the dibasic magnesium hypochlorite precipitated in the reaction mixture from the remaining aqueous solution.

3. Process as claimed in claim 2 in which said solution of magnesium salt contains from 35 to 45% of said magnesium salt calculated as the anhydrous salt.

4. Process as claimed in claim 2 in which said rate of addition is maintained between 0.2 and 0.7.

References Cited

UNITED STATES PATENTS

| 1,400,167 | 12/1921 | Kereszty et al. | 23—86 |
| 2,441,337 | 5/1948 | Sprauer | 23—86 |
| 2,446,869 | 8/1948 | Cunningham | 23—86 |
| 3,030,177 | 4/1962 | Mohan | 23—86 |

FOREIGN PATENTS

| 698,596 | 11/1940 | Germany | 23—86 |

HERBERT T. CARTER, Primary Examiner

U.S. Cl. X.R.

8—108; 23—86; 252—99, 103, 187